(12) United States Patent
Bhagwat et al.

(10) Patent No.: US 11,487,730 B2
(45) Date of Patent: Nov. 1, 2022

(54) STORAGE RESOURCE UTILIZATION ANALYTICS IN A HETEROGENEOUS STORAGE SYSTEM ENVIRONMENT USING METADATA TAGS

(71) Applicant: INTERNATIONAL BUSINESS MACHINES CORPORATION, Armonk, NY (US)

(72) Inventors: Deepavali Bhagwat, Cupertino, CA (US); Nilesh Bhosale, Warje (IN); Joseph Dain, Vail, AZ (US); James Hewitt, Eastleigh (GB); Frank N. Lee, Sunset Hills, MO (US); Wayne Sawdon, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 566 days.

(21) Appl. No.: 15/646,269

(22) Filed: Jul. 11, 2017

(65) Prior Publication Data

US 2019/0018869 A1 Jan. 17, 2019

(51) Int. Cl.
*G06F 16/22* (2019.01)
*G06F 3/06* (2006.01)
*G06F 16/14* (2019.01)
*G06F 16/11* (2019.01)

(52) U.S. Cl.
CPC ........ *G06F 16/2228* (2019.01); *G06F 3/0605* (2013.01); *G06F 3/067* (2013.01); *G06F 3/0626* (2013.01); *G06F 3/0653* (2013.01); *G06F 16/11* (2019.01); *G06F 16/14* (2019.01)

(58) Field of Classification Search
CPC .... G06F 16/2228; G06F 3/0653; G06F 16/11; G06F 16/14; G06F 3/067; G06F 3/0626; G06F 3/0605
See application file for complete search history.

(56) References Cited

U.S. PATENT DOCUMENTS

| 8,935,204 | B2 | 1/2015 | Peto et al. |
| 9,081,779 | B2 | 7/2015 | Gupta |
| 9,619,487 | B2 | 4/2017 | Bane et al. |
| 2006/0026193 | A1* | 2/2006 | Hood ................ G05B 19/0426 |
| 2010/0057692 | A1 | 3/2010 | Yoon et al. |
| 2010/0088317 | A1 | 4/2010 | Bone et al. |
| 2010/0332401 | A1* | 12/2010 | Prahlad ................ G06F 3/0667 |
| | | | 711/E12.001 |

(Continued)

FOREIGN PATENT DOCUMENTS

| KR | 1020090021932 A | 3/2009 |
| WO | 2015088483 A1 | 6/2015 |

OTHER PUBLICATIONS

List of IBM Patents or Patent Applications Treated as Related dated Jul. 12, 2017 (2 pages).

(Continued)

*Primary Examiner* — Belix M Ortiz Ditren
*Assistant Examiner* — Yohanes D Kelemework
(74) *Attorney, Agent, or Firm* — Griffiths & Seaton PLLC

(57) ABSTRACT

Embodiments for storage resource utilization analytics using metadata tags by a processor. Storage capacity utilization in the plurality of heterogeneous storage systems may be determined using one or more events indexed into a centralized search index.

17 Claims, 8 Drawing Sheets

(56) References Cited

U.S. PATENT DOCUMENTS

| | | |
|---|---|---|
| 2014/0181063 A1 | 6/2014 | Pidduck |
| 2014/0310278 A1 | 10/2014 | D'Amato et al. |
| 2015/0205834 A1 | 7/2015 | Keeton et al. |
| 2016/0313934 A1 | 10/2016 | Isherwood et al. |
| 2016/0314163 A1 | 10/2016 | Marquardt et al. |
| 2017/0006135 A1* | 1/2017 | Siebel .................... H04L 67/12 |
| 2017/0085447 A1* | 3/2017 | Chen .................... H04L 43/024 |
| 2017/0093645 A1* | 3/2017 | Zhong .................... H04L 67/10 |
| 2017/0161288 A1 | 6/2017 | Feldman et al. |
| 2018/0121035 A1* | 5/2018 | Filippi .................... G06F 40/14 |
| 2018/0314751 A1* | 11/2018 | Filippi ................. G06F 16/283 |
| 2018/0365627 A1 | 12/2018 | Mansour et al. |
| 2019/0163821 A1 | 5/2019 | Pal et al. |

OTHER PUBLICATIONS

Anonymous, "Method for Notification Events classification based on Tags," An IP.com Prior Art Database Technical Disclosure, IP.com No. IPCOM000206918D, May 13, 2011 (8 pages).

Anonymous, "A method for integrating additional content-oriented metadata into file system data structures to improve user access," An IP.com Prior Art Database Technical Disclosure, IP.com No. IPCOM000240079D, Dec. 29, 2014 (3 pages).

Thorat, "Object Storage Analytics: Leveraging Cognitive Computing for Deriving Insights and Relationships," Storage Developer Conference, Santa Clara, 2016 (34 pages).

* cited by examiner

STORAGE RESOURCE UTILIZATION ANALYTICS IN A HETEROGENEOUS STORAGE SYSTEM ENVIRONMENT USING METADATA TAGS

CROSS-REFERENCE TO RELATED APPLICATIONS

This Application is related to U.S. application Ser. Nos. 15/646,278 and 15/646,284, each filed on even date as the present Application.

BACKGROUND OF THE INVENTION

Field of the Invention

The present invention relates in general to computing systems, and more particularly to, various embodiments for storage resource utilization analytics using metadata tags using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing and storing very large amounts of information is a key problem to solve.

SUMMARY OF THE INVENTION

Various embodiments for storage resource utilization analytics using metadata tags by a processor are provided. Storage capacity utilization in the plurality of heterogeneous storage systems may be determined using one or more events, containing metadata, indexed into a centralized search index.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
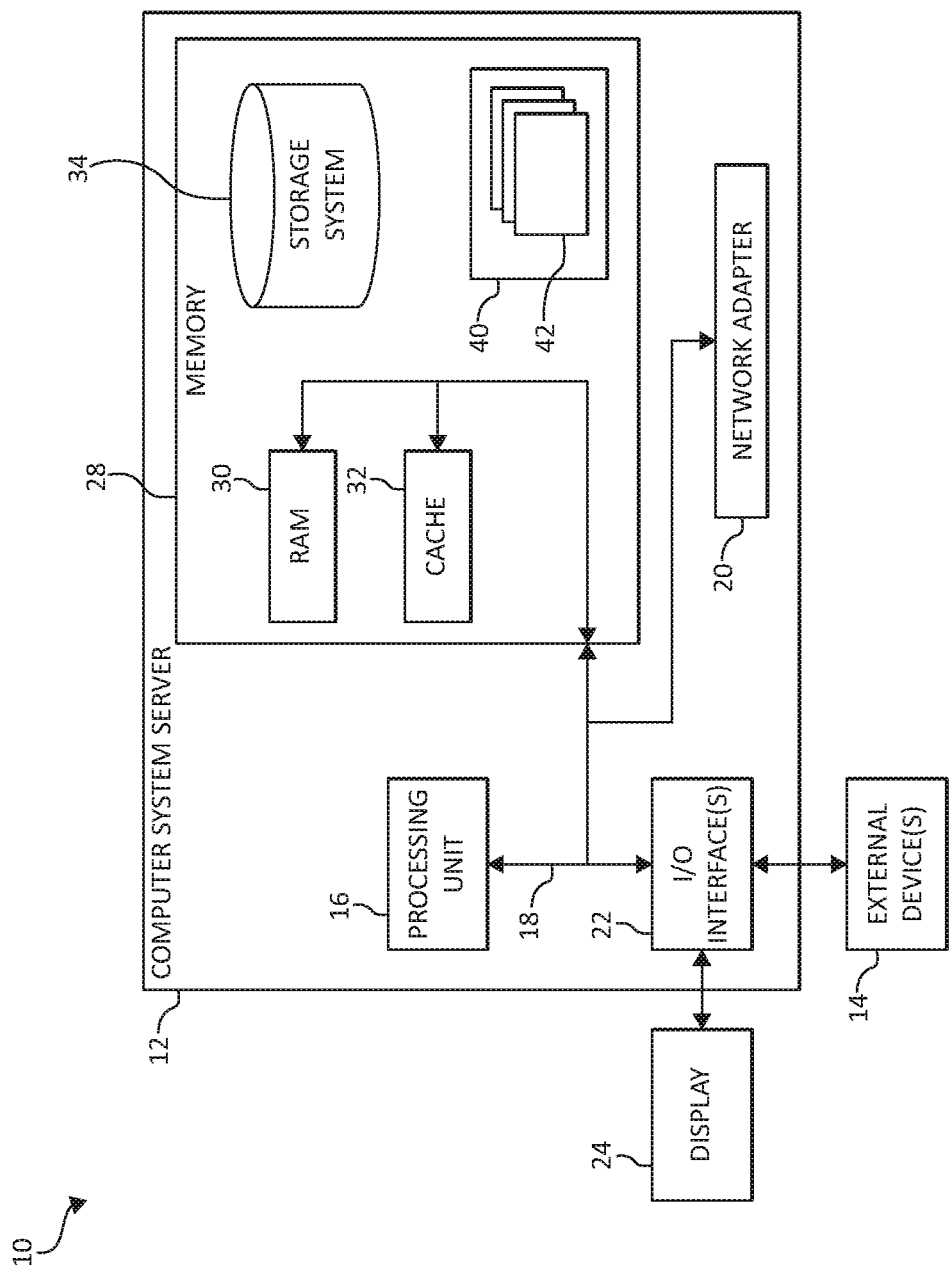
FIG. 1 is a block diagram depicting an exemplary cloud computing node according to an embodiment of the present invention.

Within a computing storage architecture, such as a storage area network (SAN) system or cloud computing system, it is often considered desirable to intelligently distribute data across different types of storage media to improve access performance and reduce storage costs. Such types of storage management systems may perform various data management and storage area management functions, including application management, resource availability management, network management, performance management, service management, systems management, and the like. For example, cloud computing is a computing technology that uses the Internet and central remote servers to maintain data and applications. A Cloud provider may employ multiple Clouds when providing a set of services to a customer. There are scenarios where it is necessary for multiple storage systems, such as multiple Clouds, to inter-operate to provide an overall composite service to a customer.

Some computing storage architecture systems also require storage accountant functionality. Large enterprise systems and service providers frequently want to measure or meter the storage assigned to end users, for financial analysis, budgeting and chargeback. Some storage providers will classify their offerings into different service levels and will manage information related to those service levels. A storage billing application or function allows the storage providers to analyze and recover costs associated with providing storage services. The challenge with providing such storage billing functionality lies in the diversity of possible storage system configurations and in the diversity of possible factors that a particular system administrator may wish to monitor. For example, a system administrator may wish to calculate usage charges based on input/output and file system usage. The administrator may wish to calculate cost by network domain, by host, by storage device, or by some other physical or logical aspect. The administrator may wish to allow special pricing rules and may need to make billing adjustments in real time.

Thus, current methods for billing and metering often times have too course of granularity or may not be sufficiently granular. Also, current methods for billing and metering do not work seamlessly across a heterogeneous storage environment and require users to manually define relationships of resource utilization mapped to various departments, projects, and/or applications, etc., while also presenting consistency and scalability challenges. Other challenges of current methods for billing and metering include both the inability to provide sufficient tracking and reporting access by various departments, projects, and/or applications and the inability to allow reporting by learning the relationship of resource utilization by department, project or other types of custom aggregation.

Accordingly, the present invention provides for an analytics based metering, showback, and billing system across a heterogeneous storage environment that includes fine grain reporting and may automatically learn utilization by department, project, and other types of groupings.

In one aspect, the mechanisms of the various embodiments provide for storage resource utilization analytics using metadata tags by a processor. Storage capacity utilization in the plurality of heterogeneous storage systems may be determined using one or more events, containing metadata, indexed into a centralized search index. In one aspect, an event may be a computer event or an action or occurrence recognized by an application and/or storage system that may be handled by the application and/or storage system. An event may be any action, process, operation, or occurrence initiated by a computer or user. Data may be tagged with metadata, such as custom metadata, such that the metadata may be indexed into a common repository, such as a centralized search index, via an event from a plurality of heterogeneous storage systems so as to determine storage capacity in the plurality of heterogeneous storage systems. For example, when a user writes a file, a storage system may emit system metadata such as, for example, the name of the file, the path, the file size, the owner, or a combination thereof. An owner field of the system metadata may be used along with other metadata (e.g., custom metadata) to determine capacity utilization for the storage system. The data may be tagged with custom metadata (such as a particular department or project) which may then be sent along with the system metadata in the event and you can then determine the resource utilization based on the custom metadata tag.

In an additional aspect, data (e.g. files and objects) may be tagged with custom metadata. The custom metadata tags may be indexed in a centralized metadata store via live/real-time events from a plurality of heterogeneous storage systems, and using the custom metadata in conjunction with system metadata (e.g., size pool metadata and storage pool metadata), operation type (e.g., read operation, write operation, get operation, put operation, delete operation, etc.), or a combination thereof. Analytics may be performed on the content (e.g., the custom metadata in conjunction with size and storage pool metadata) from the centralized metadata store to provide fine grain capacity utilization information across a heterogeneous storage domain.

The tagging of the data may also include leveraging one or more source storage system leverage representational state transfer (REST) application protocol interfaces (API) such as, for example, object storage APIs to set custom metadata tags or set extended attributes in file systems, where the custom metadata tags may be captured in real-time in the centralized metadata store. The data may be automatically tagged in a storage system based on predefined rules in a policy engine. In response to receiving an event, the content of the live event may be inspected and custom metadata tags may be added to the data upon matching selected criteria according to the predefined rules. For example, a rules mechanism that maps users to departments and automatically sets department custom metadata tags in real-time, which may entail doing a lightweight directory access protocol ("LDAP") lookup, active directory ("AD") lookup, keystone server lookup, or other type of authentication lookup where, in order to avoid unnecessary authentication server lookups, the lookup only performs if the custom mapping is unknown.

In an additional aspect, custom metadata key values may be added and used for resource utilization analytics to existing storage system metadata records via real-time indexing by events sent from the underlying storage system where the custom metadata tags may be added after the initial indexing of the live event containing the resource utilization metrics. That is, the events from a plurality of heterogeneous storage systems may also be indexed into the common repository. A migration data placement tool uses analytics to determine data placement of the data in a target storage system according to the data identified as hot data, warm data, or cold data based on the events indexed in the common repository. The data may be placed according to a migration template during migration to the target storage system.

The mechanisms of the illustrated embodiments may leverage an event driven index and search infrastructure called "metaocean" (e.g., the centralized search index) across multiple source systems for storage resource utilization analytics using metadata (e.g., custom metadata) tags. In one aspect, the metaocean may be the common repository, centralized search index, or centralized key-value store.

In an additional aspect, events and the metadata tags may be indexed across a heterogeneous storage environment into the centralized key-value store (e.g., the metaocean). A search across the centralized key-value store may be performed for the events, metadata, or a combination thereof. In one aspect, the central repository may be a key-value store such as, for example, the centralized key-value store, but may also be a database such as, for example, a DB2 database provided by IBM® and/or a flat file or an extensible markup language (xml) file or any other way of storing information.

Thus, the present invention provides for fine grain resource utilization analytics across a heterogeneous storage domain leveraging real-time events. Consistency issues are eliminated. The present invention also enables flexible resource utilization analytics based on a custom tagging scheme defined by a user. Users/administrators are enabled to set custom metadata tags using native source storage data path APIs and methods that may be transparent to applications. The present invention also allows for automated tagging of custom metadata to be used for resource utilization analytics transparent to the storage and application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
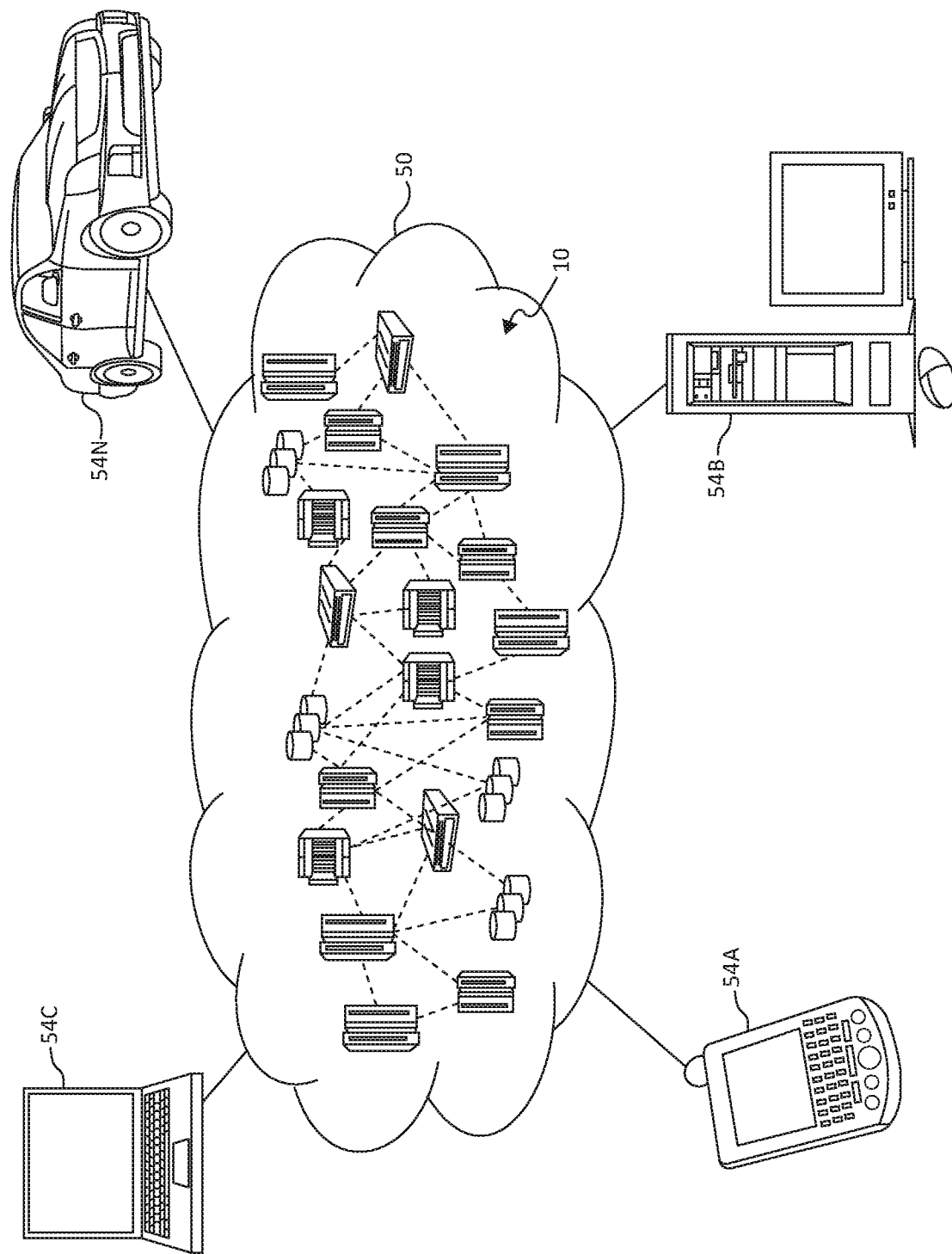
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
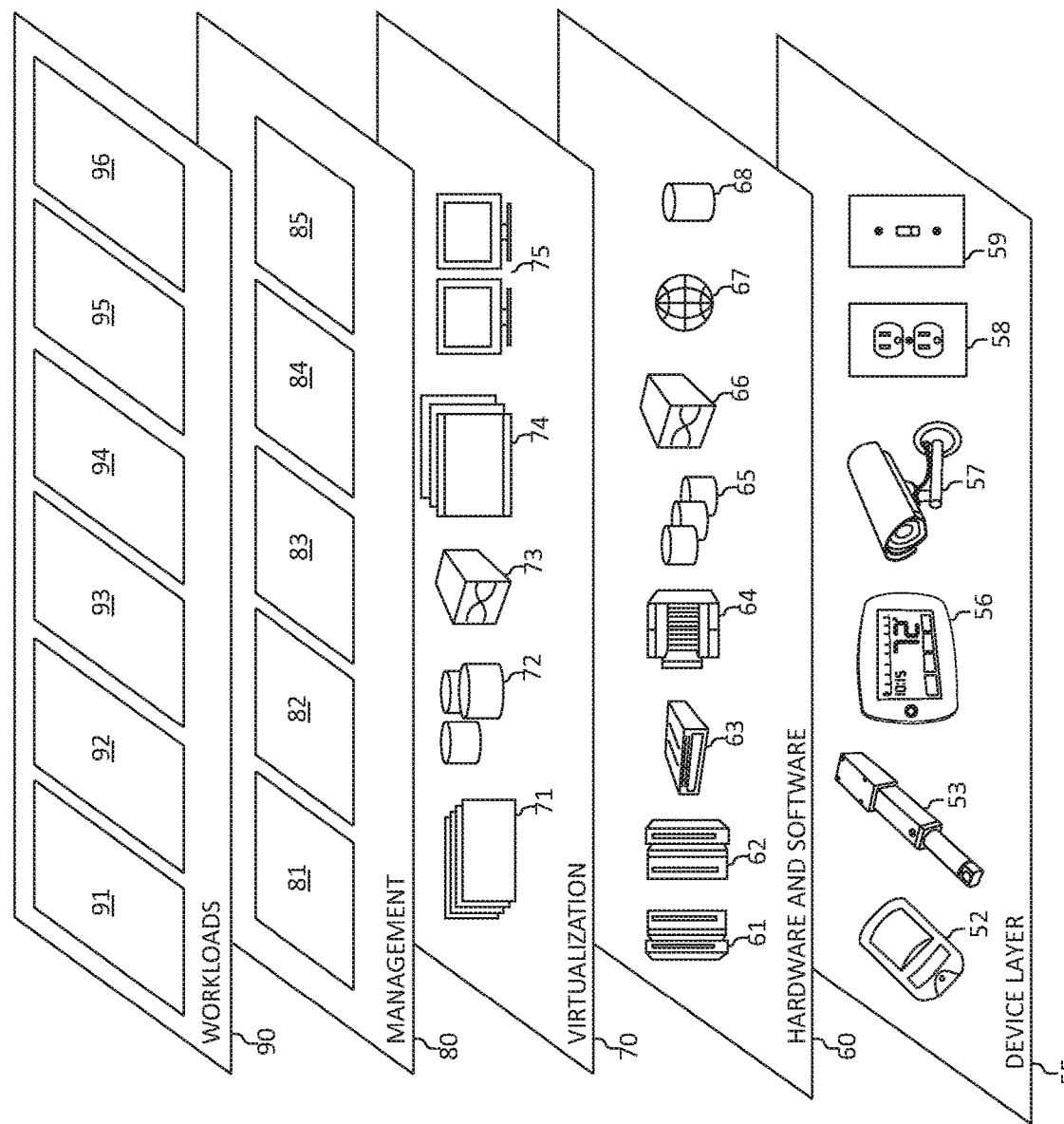
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various storage resource utilization analytics using metadata tags workloads and functions 96. In addition, storage resource utilization analytics using metadata tags workloads and functions 96 may include such operations as data analysis (including data collection and processing from various environmental sensors), metadata tagging, storage resource utilization analytics using metadata tags, and/or analytics operations. One of ordinary skill in the art will appreciate that the storage resource utilization analytics using metadata tags workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the storage resource utilization analytics using metadata tags workloads. For example, the present invention may leverage a customized, application defined infrastructure tool that may be referred to herein as a metaocean, as illustrated in FIG. 4.

Figure 4:
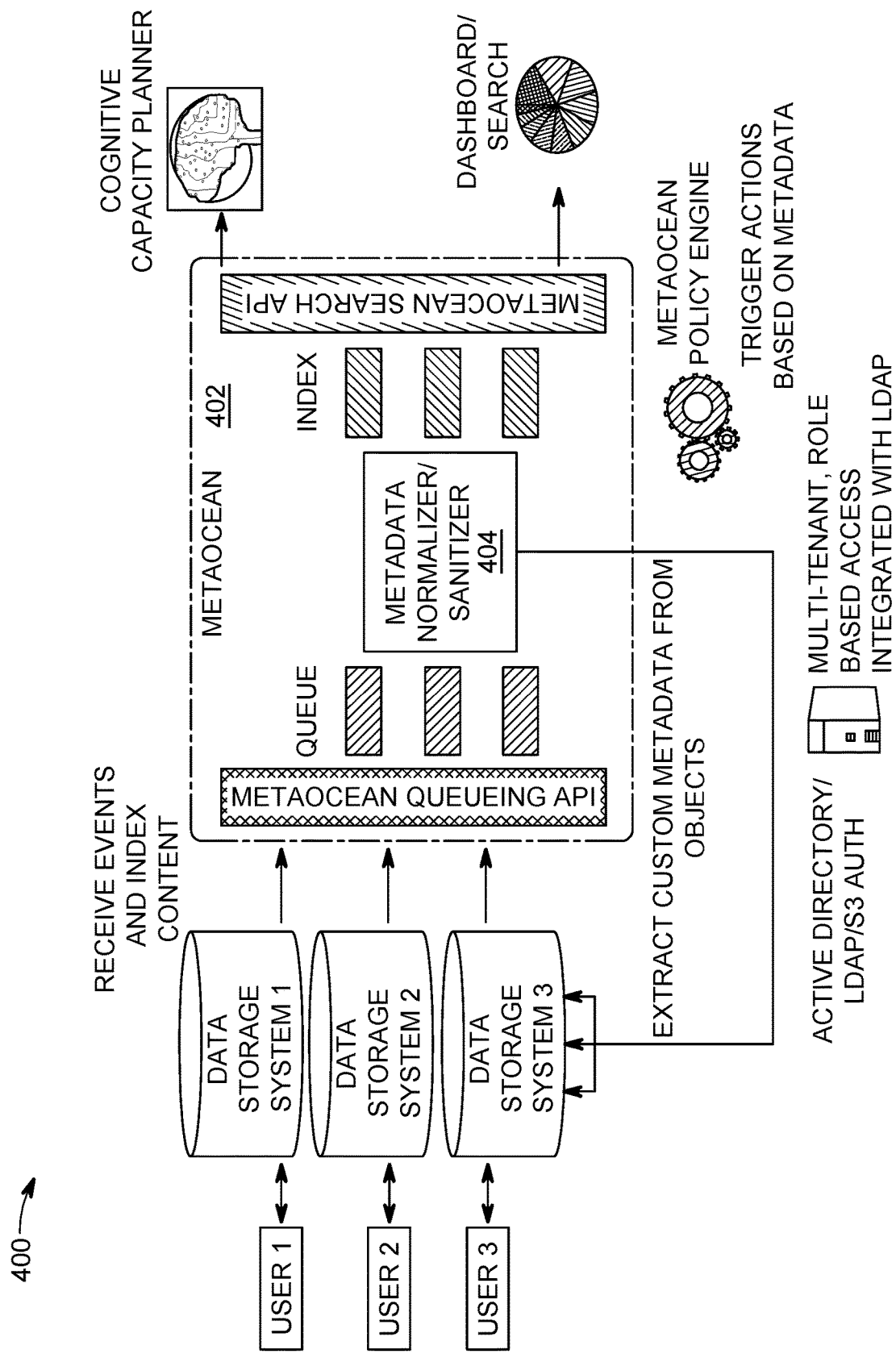
FIG. 4 is an additional block diagram depicting various user hardware and cloud computing components functioning using a centralized search index for indexing metadata in accordance with aspects of the present invention.

Turning now to FIG. 4, a block diagram 400 depicting various user hardware and cloud computing components functioning using a centralized event driven index and search infrastructure called "metaocean" 402 having a migration data placement tool is depicted. The event driven index and search infrastructure may include a queuing application programming interface ("API" or "metaocean queueing API") for receiving one or more events from a plurality of heterogeneous storage systems such as, for example, data storage system 1, data storage system 2, and/or data storage system 3, for one or more users, which may be web service providers (e.g., user 1, user 2, and/or user 3 of FIG. 4). The event driven index and search infrastructure 402 (e.g., a centralized search index or the metaocean) may also include a search API (e.g., a "metaocean search API"). In one aspect, data storage system 1 may be a high latency media such as, for example tape, optical, and/or a massive array of idle disks (MAID), data storage system 2 may be a distributed file system (DFS), and/or data storage system 3 may be object storage. For example, the plurality of heterogeneous storage systems (which may be web service providers) may be Spectrum Scale LightWeightEvents provided by IBM®, Spectrum Archive Event Notification provided by IBM®, S3 Simple notification service provided by Amazon®, Cloud Object Storage Event Notification provided by IBM®, fPolicy provided by NetApp®, and/or other web service providers.

The events and content of the events may be placed in the queue (such as for example, an open source message queue such as Apache® Kafka®) of the event driven index and search infrastructure 402 (e.g., the metaocean). The event driven index and search infrastructure 402 may also include a metadata normalizer and/or sanitizer 404 (e.g., data purging) and an index for indexing the events or contents of the events. For example, the event driven index and search infrastructure 402 may capture metadata received from multiple heterogeneous sources such as, for example, user 1, user 2, and/or user 3, and index the content. One or more users may query the set of information in order to perform data analytics and select a course of action (e.g., data migration strategy) based on the mined data. In one embodiment, users may include one or more interfaces, for controlling access to files stored on and/or in the users' devices or systems, to send events to the event driven index and search infrastructure 402 about activity on the user.

The metadata normalizer 404 (and/or sanitizer) may also remove the events from the queue and extract custom metadata from the data (e.g., files or objects). The custom metadata tags may be indexed in a centralized metadata store via live/real-time events from a plurality of heterogeneous storage systems. The custom metadata may be used in conjunction with source metadata (e.g., size pool metadata and storage pool metadata), operation type (e.g., read operation, write operation, get operation, put operation, delete operation, etc.), or a combination thereof. Analytics may be performed on the content (e.g., the custom metadata in conjunction with size and storage pool metadata) from the centralized metadata store to provide fine grain capacity utilization information across a heterogeneous storage domain. In an additional aspect, custom metadata key values may be added and used for resource utilization analytics to existing storage system metadata records via real-time indexing by events sent from the underlying storage system where the custom metadata tags may be added after the initial indexing of the live event containing the resource utilization metrics. That is, the events from a plurality of heterogeneous storage systems may also be indexed into the common repository.

The data may be automatically tagged in a storage system based on pre-defined rules in a policy engine (e.g., metaocean policy engine). In response to receiving an event, the content of the live event may be inspected and custom metadata tags may be added to the data upon matching selected criteria according to the predefined rules. For example, a rules mechanism that maps users to departments and automatically sets department custom metadata tags in real-time, which may include performing a lightweight directory access protocol ("LDAP") lookup, active directory ("AD") lookup, keystone server lookup, or other type of authentication lookup where, in order to avoid unnecessary authentication server lookups, the lookup only performs if the custom mapping is unknown (e.g., using multi-tenant, role based access integration with LDAP). Thus, the policy engine, having one or more rules and/or policies, may trigger performance based on the custom metadata tags.

Thus, the event driven index and search infrastructure 402 (e.g., a centralized search index or metaocean) enables users, departments, and/or projects to perform cognitive capacity planning based on real-time events by tracking storage utilization for a plurality of heterogeneous storage systems from a unified control plane. That is, the cognitive capacity planner, working in conjunction with the event driven index and search infrastructure 402 (e.g., a centralized search index or metaocean), provides for viewing and planning capacity utilization across the plurality of heterogeneous storage systems environment by users, departments, and/or projects, etc. The event driven index and search infrastructure 402 (e.g., a centralized search index or metaocean) may provide tracking and reporting using the custom metadata tag. The metaocean may also be searched and the search results (e.g., a fine grain capacity utilization tracking and reporting report) may be provided to a graphical user interface (GUI) of a computing device or dashboard of the device.

Figure 5:
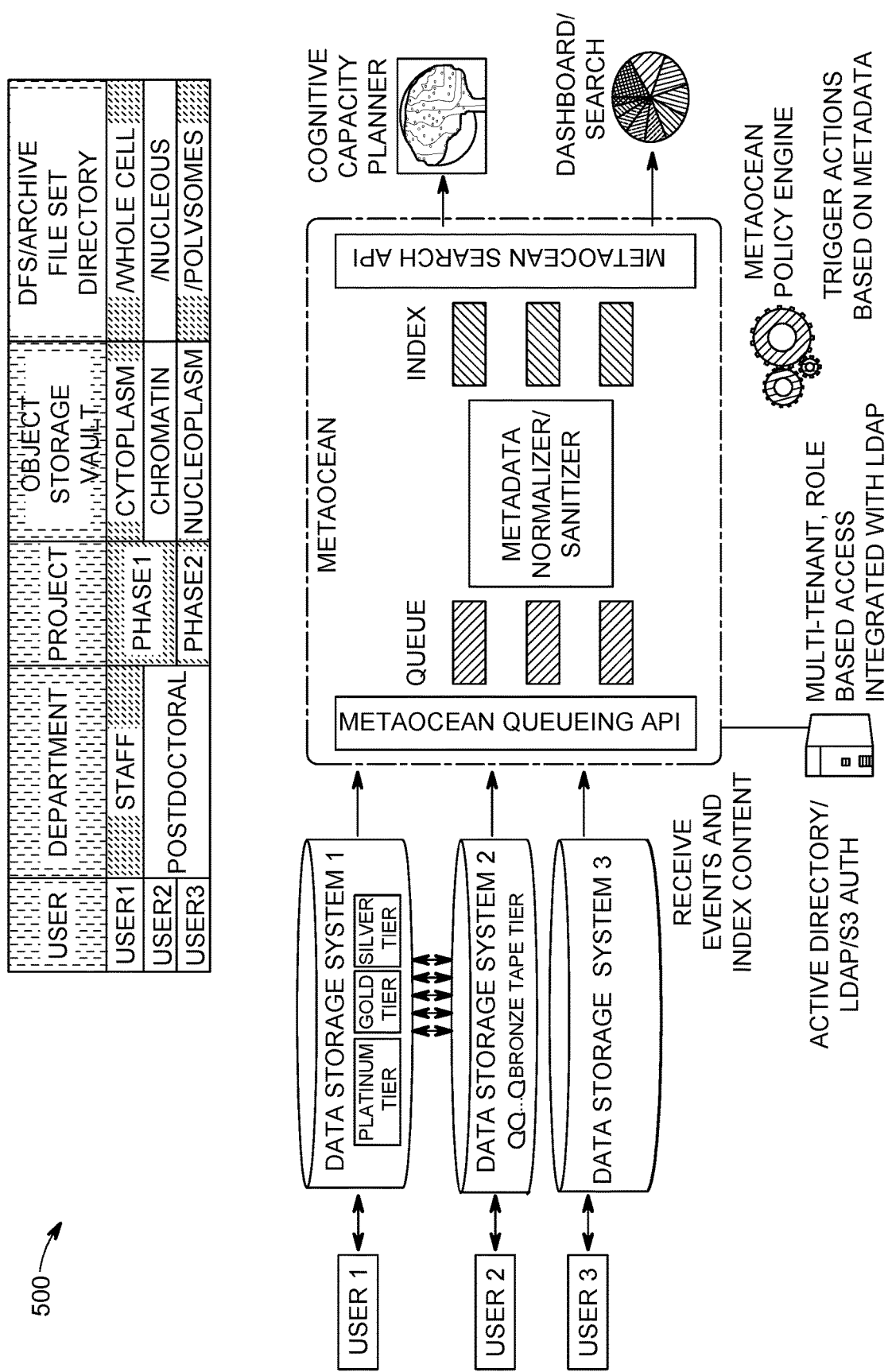
FIG. 5 is an additional block diagram depicting cognitive storage capacity planning, billing, and metering in which aspects of the present invention may be realized.

With the foregoing functional components 400 in view, cognitive storage capacity planning, billing and metering may be performed on the event data extracted from the source system that may be stored in the metaocean with the custom metadata tagged to the data, as illustrated in block diagram 500 of FIG. 5, depicting cognitive storage capacity planning, billing, and metering. For example, multiple users (e.g., users 1-3) may store and access one or more types of data (e.g., files or objects) such as, for example, binary version of sequence alignment map (SAM) (BAM) files or variant call format (VCF) files, in one or more of the plurality of heterogeneous storage systems, such as, for example, Spectrum Scale provided by IBM®, Spectrum Archive provided by IBM®, cloud computing, and the like. For example, the plurality of heterogeneous storage systems may be data storage system 1, data storage system 2, and/or data storage system 3 (as described in FIG. 4). One of the plurality of heterogeneous storage systems such as, for example, data storage system 1 may be Spectrum Scale provided by IBM®, which may include a plurality of storage pools that may be a platinum tier (e.g., flash or solid state drive "SSD" memory), a gold tier and/or a silver tier (e.g., near line SAS storage) in for data storage. A user may store the data in one or more of the plurality of heterogeneous storage systems. The various storage systems and storage system tiers each may have various different storage characteristics and cost points. Thus, when a user interacts with the various heterogeneous storage systems, the heterogeneous storage systems may create an event containing information (e.g., system metadata) of the storage pool where the data resides.

Each of the plurality of heterogeneous storage systems may send the events (which may contain the storage subsystem information) to the centralized search index (e.g., metaocean) based on the user activity. The data (e.g., the BAM files or VCF files) may be tagged with a project and department custom metadata key-value pairs. The metaocean may index the event content and provide cognitive storage capacity planning, billing, and metering services. The cognitive storage capacity planning provides for viewing and planning storage capacity across the plurality of heterogeneous storage systems by user, project, and/or department. For example, a GUI may depict a table that may include columns showing user, department, project, and heterogeneous storage system type such as, for example, object storage vault or DFS/archive file set directory with archive file set director (e.g., data storage system 3 ("object storage") and data storage system 2 (IBM® Spectrum Archive)). The rows may show the user of the storage system.

Figure 6:
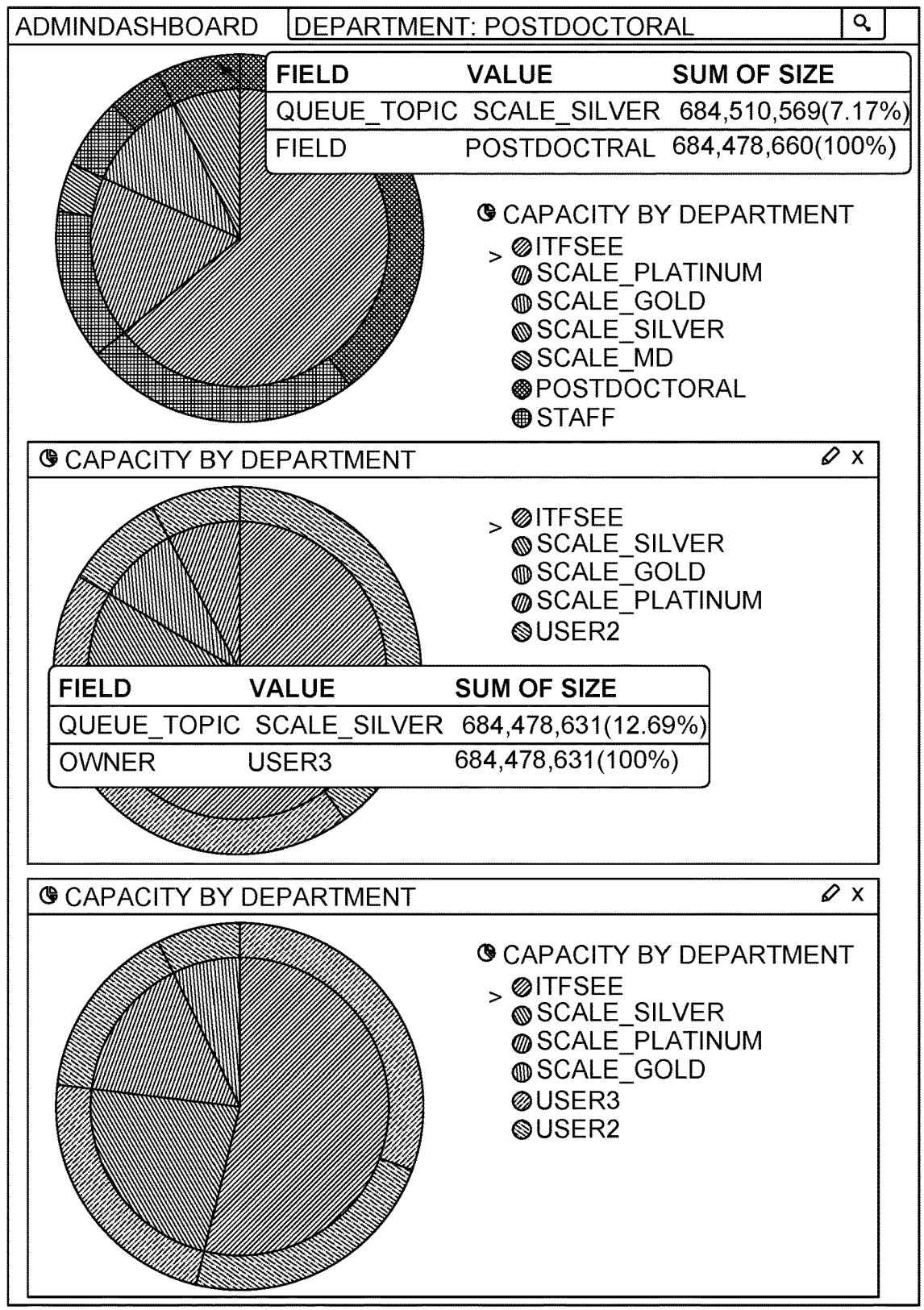
FIG. 6 is a diagram depicting an interactive graphical user interface (GUI) display of a centralized search index in which aspects of the present invention may be realized.

FIG. 6 is a diagram depicting an interactive graphical user interface (GUI) display 600 of an event driven index and search infrastructure for storage resource utilization analytics using metadata tags. As shown, the various functionality, or "modules" of functionality, hardware devices, and/or other components in the same descriptive sense as has been previously described in FIGS. 1-4 may be included in FIG. 6. In one aspect, an interactive graphical user interface (GUI) 600 of the centralized key-value store or "metaocean" may be provided to enable a user to perform and report storage resource utilization analytics using metadata tags. For example, a user may select specific portions of the output (displayed in the interactive GUI as a circular wheel or "pie graph") and drill down into the interactive display.

For example, the interactive GUI 600 illustrates the output of the migration configuration template as the "pie graph". In one aspect, a name, a size, field, value, and/or owner of the data of the event/data may be provided when drilling down into the output displayed in the interactive GUI. For each user, the storage capacity utilization may be displayed in real-time when drilling down into the output displayed in the interactive GUI.

For example, the system metadata and the custom metadata for an event may be displayed in the GUI. In one aspect, a cursor (e.g., an arrow) may be placed on a section of the GUI (e.g., a section of the pie chart) which may display data relating to that selected portion of the GUI. For example, as illustrated in FIG. 6, selecting on at least a portion of the GUI (e.g., a pie chart) within the administrator dashboard ("admindashboard"), data may be displayed showing the field, value, and/or sum of size. The field "Queue_topic" may be located in the silver tier storage pool of one of the heterogeneous storage systems as indicated by the value data storage 1 silver tier (e.g., "scale_silver" such as a silver level of IBM® Spectrum Scale® having different storage pools—solid state drives "SSD", serial attached small computer system interface "SCSI" (SAS), near line (NL)-SAS, or tape pools—with different costs, performance, capacity characteristics, and the like) with the sum of the size of the file being displayed (e.g., 7.17% or 684,510,569 bytes or other capacity measurement such as, for example, megabyte "MB", gigabyte "GB", terabyte "TB", or petabyte "PB"). The custom metadata tag of the object may track storage capacity utilization such as, for example, the key is the department and the value is the postdoctoral. The system metadata (containing the size of the file and the storage pool where the file resides) and the custom metadata may be aggregated to provide real-time capacity showback across the heterogeneous storage systems with fine granularity. Other pie charts for capacity by department for user 2, and user 2 and 3 are displayed for illustrative convenience. It should be noted that FIG. 6 may display the data on the GUI in one of a plurality of formats and options such as, for example, pie charts, graphs, charts, documents, or other ways, means, or methods according to user preference and computing capabilities.

Figure 7:
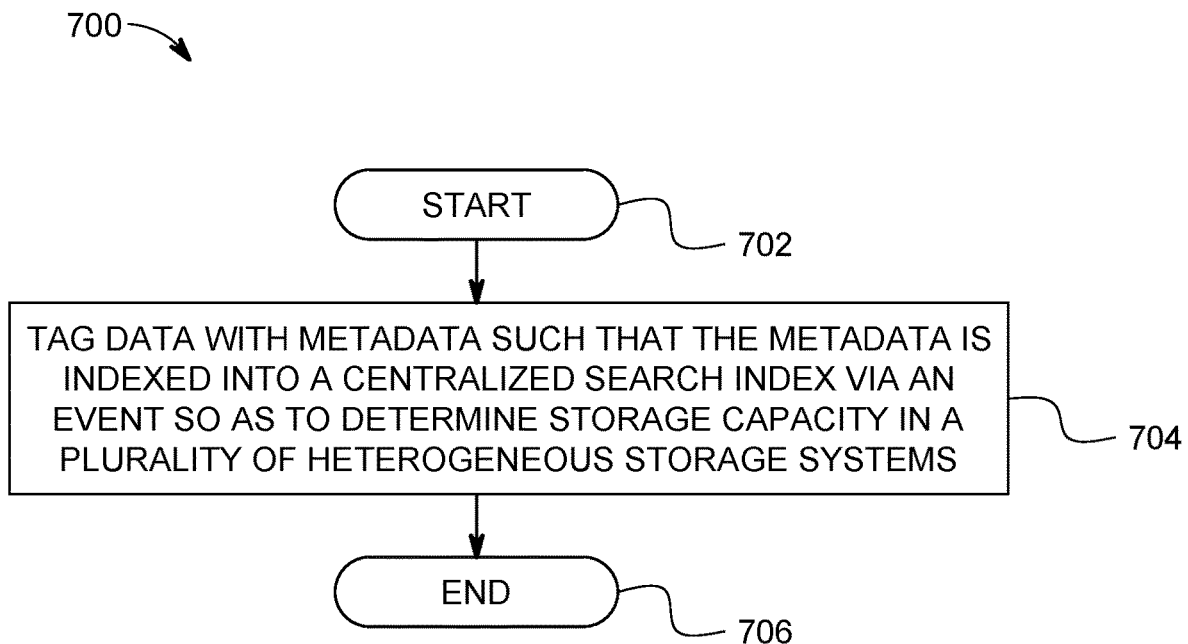
FIG. 7 is an additional flowchart diagram depicting an exemplary method for storage resource utilization analytics using metadata tags by a processor; again, in which aspects of the present invention may be realized.

Turning now to FIG. 7, a method 700 for storage resource utilization analytics using metadata tags (e.g., custom metadata tags) is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702. Data may be tagged with metadata such that the metadata is indexed into a centralized search index via an event so as to determine storage capacity in a plurality of heterogeneous storage systems, as in block 704. The functionality 700 may end in block 706.

Figure 8:
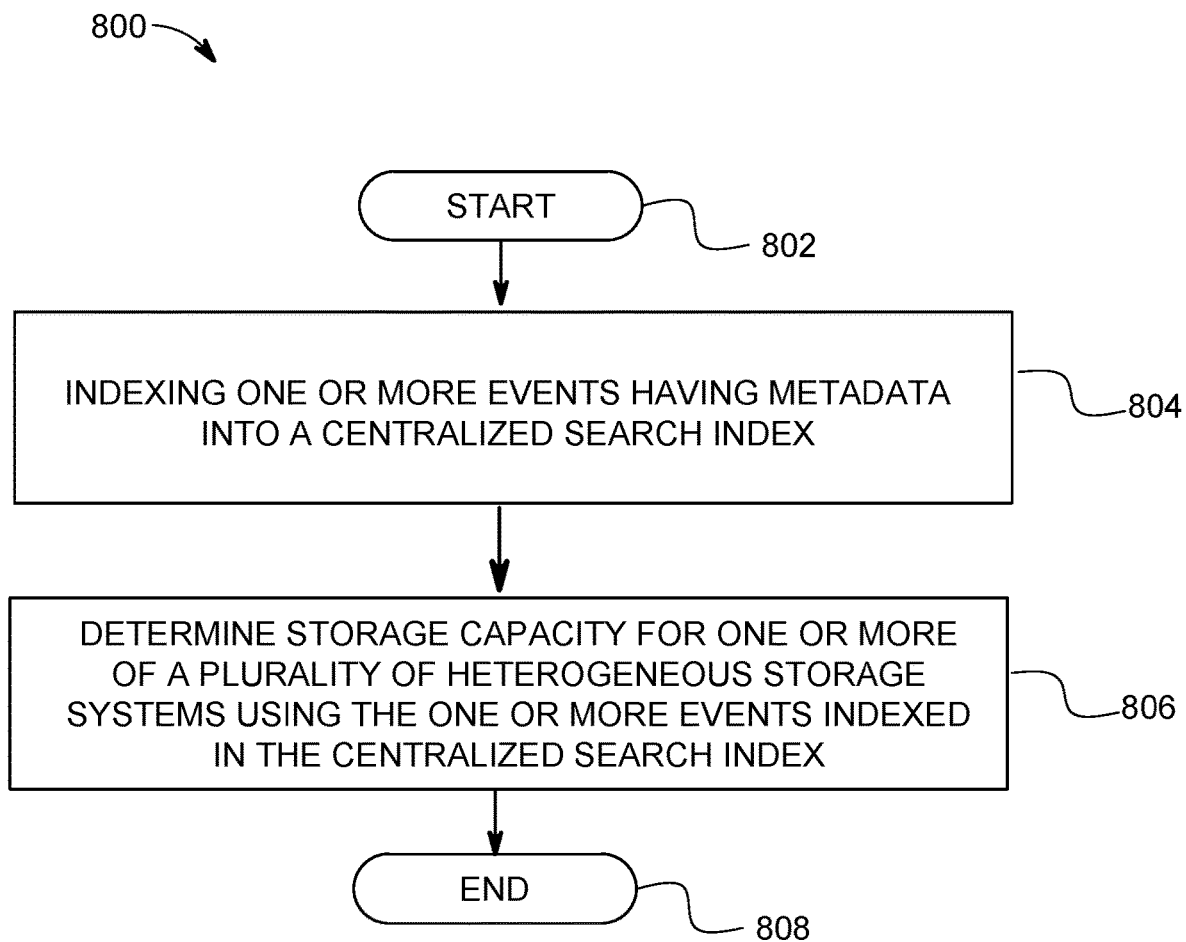
FIG. 8 is an additional flowchart diagram depicting an exemplary method for determining storage resource utilization using events (having custom metadata tags) by a processor; again, in which aspects of the present invention may be realized.

Turning now to FIG. 8, a method 800 for storage resource utilization analytics using events (having custom metadata tags) is depicted, in which various aspects of the illustrated embodiments may be implemented. The functionality 800 may be implemented as a method executed as instructions on a machine, where the instructions are included on at least one computer readable medium or on a non-transitory machine-readable storage medium. The functionality 800 may start in block 802. One or more events may be indexed into a centralized search index, as in block 804. Storage capacity in one or more of a plurality of heterogeneous storage systems may be determined using the one or more events indexed in the centralized search index, wherein the one or more events include metadata (e.g., system metadata and/or custom metadata), as in block 806. That is, capacity resource utilization may be determined using system metadata. However, determining capacity resource utilization may be enhanced by using and adding custom metadata tags to the event. For example, when a user writes a file, a storage emits system metadata such as the name of the file, the path, the file size, and the owner. The owner field of the system metadata can be used along with other metadata to determine capacity utilization for the storage system. The data may be tagged with custom metadata (such as a particular department or project) which may then be sent along with the system metadata in the event and you can then determine the resource utilization based on the custom metadata tag. The functionality 800 may end in block 808.

In one aspect, in conjunction with and/or as part of at least one block of FIG. 8, the operation of 800 may include each of the following. The operation of functionality 800 may analyze the metadata (e.g., custom metadata) of the one or more events to identify storage capacity utilization information across the plurality of heterogeneous storage systems. The metadata may be custom metadata and the one or more events may be from the plurality of heterogeneous storage systems.

The operation of functionality 800 may tag the data with the metadata according to one or more pre-defined rules, wherein the metadata is used in conjunction with storage size metadata, storage pool metadata, a type of operation, or a combination thereof. The data of the event from one of the plurality of storage systems may be tagged with the metadata upon determining the data matches selected criteria of the one or more pre-defined rules.

The operation of functionality 800 may leverage representational state transfer (REST) application protocol interface (API) to set the metadata. Key values may be added to the metadata such that the key values are used as analytics for existing metadata records of events associated the plurality of heterogeneous storage systems. The centralized search index is a centralized key-value store. The operation of functionality 800 may add the metadata to the data subsequent to indexing the event into the centralized search index, wherein the one or more events include one or more storage resource utilization metrics of the plurality of heterogeneous storage systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for storage resource utilization analytics, comprising:

receiving, by each of a plurality of heterogeneous storage systems of varying file system and object storage architectures, requests to perform storage actions on data respectively stored in the plurality of heterogeneous storage systems, wherein the requests to perform the storage actions are each initiated by a user or application on a computer in networked communication with a respective one of the plurality of heterogeneous storage systems in which the data is stored, and wherein metadata associated with each storage action is emitted by the respective one of the plurality of heterogeneous storage systems upon performing the storage action;

responsive to performing the storage actions, creating, by each of the plurality of heterogeneous storage systems, one or more events containing the metadata respectively describing the storage actions;

responsive to creating the one or more events, sending, by each of the plurality of heterogeneous storage systems, the one or more events and the metadata as a message to a centralized search index via a message queue;

responsive to receiving the message by the centralized search index from the message queue, extracting the one or more events from the message and indexing the one or more events according to the metadata, wherein the metadata is normalized from a first format describing each storage action performed by those of the plurality of heterogeneous storage systems implementing the file system architecture and a second format describing each storage action performed by those of the plurality of heterogeneous storage systems implementing the object storage architecture into a third, standardized format for indexing;

determining storage capacity in each of the plurality of heterogeneous storage systems by exclusively examining, within the centralized search index for each respective storage system of the plurality of heterogeneous storage systems, the metadata associated with each storage action undertaken by the user or the application;

responsive to receiving the one or more events by the plurality of heterogeneous storage systems and analyzing content of the one or more events, automatically tagging data of the one or more events with the metadata in real-time as the data is received into one or more of the plurality of heterogeneous storage systems according to one or more pre-defined rules applied to the content, wherein determining the storage capacity further includes aggregating those of the one or more events having been automatically tagged as belonging to at least a particular person, project, and business entity, and determining storage usage specific to one of the at least the particular person, project, and business entity using only information contained in the metadata of those of the one or more events stored in the centralized search index such that the storage usage specific to the one of the at least the particular person, project, and business entity is determined only from event information in the centralized search index and not through any information contained in the data itself;

in conjunction with determining the storage usage, receiving input on a graphical user interface (GUI) using a pointing device to select one of the particular person, project, and business entity;

responsive to receiving the selection from the input of the pointing device, analyzing, in real-time when the selection is received, the metadata to identify storage capacity utilization information across the plurality of heterogeneous storage systems, wherein the metadata is custom metadata, the one or more events are from the plurality of heterogeneous storage systems, and the storage capacity utilization information is generated in real-time by scanning the metadata and aggregating the one or more events using the custom metadata at the time of receiving the selection of the input using the pointing device; and mapping the user to a department of the business entity having set in the centralized search index department-specific metadata tags, wherein an authentication lookup of the user to determine the department to apply the department-specific metadata tags to the data is performed only when the user mapping to the department is unknown.

2. The method of claim 1, wherein the metadata is used in conjunction with storage size metadata, storage pool metadata, a type of operation, or a combination thereof.

3. The method of claim 2, further including tagging the data of the one or more events with the metadata upon determining the data matches selected criteria of the one or more pre-defined rules.

4. The method of claim 1, further including leveraging a representational state transfer (REST) application protocol interface (API) to set the metadata.

5. The method of claim 1, further including adding key values to the metadata such that the key values are used as analytics for existing metadata records of events associated with the plurality of heterogeneous storage systems, wherein the centralized search index is a centralized key-value store.

6. The method of claim 1, further including:
indexing the one or more events into the centralized search index; and
adding the metadata to the data of the one or more events subsequent to indexing, wherein the one or more events include one or more storage resource utilization metrics of the plurality of heterogeneous storage systems.

7. A system for storage resource utilization analytics, comprising:
one or more computers with executable instructions that when executed cause the system to:
receive, by each of a plurality of heterogeneous storage systems of varying file system and object storage architectures, requests to perform storage actions on data respectively stored in the plurality of heterogeneous storage systems, wherein the requests to perform the storage actions are each initiated by a user or application on a computer in networked communication with a respective one of the plurality of heterogeneous storage systems in which the data is stored, and wherein metadata associated with each storage action is emitted by the respective one of the plurality of heterogeneous storage systems upon performing the storage action;
responsive to performing the storage actions, create, by each of the plurality of heterogeneous storage systems, one or more events containing the metadata respectively describing the storage actions;
responsive to creating the one or more events, send, by each of the plurality of heterogeneous storage systems, the one or more events and the metadata as a message to a centralized search index via a message queue;
responsive to receiving the message by the centralized search index from the message queue, extract the one or more events from the message and index the one or more events according to the metadata, wherein the metadata is normalized from a first format describing each storage action performed by those of the plurality of heterogeneous storage systems implementing the file system architecture and a second format describing each storage action performed by those of the plurality of heterogeneous storage systems implementing the object storage architecture into a third, standardized format for indexing;
determine storage capacity in each of the plurality of heterogeneous storage systems by exclusively examining, within the centralized search index for each respective storage system of the plurality of heterogeneous storage systems, the metadata associated with each storage action undertaken by the user or the application;
responsive to receiving the one or more events by the plurality of heterogeneous storage systems and analyzing content of the one or more events, automatically tag data of the one or more events with the metadata in real-time as the data is received into one or more of the plurality of heterogeneous storage systems according to one or more pre-defined rules applied to the content, wherein determining the storage capacity further includes aggregating those of the one or more events having been automatically tagged as belonging to at least a particular person, project, and business entity, and determining storage usage specific to one of the at least the particular person, project, and business entity using only information contained in the metadata of those of the one or more events stored in the centralized search index such that the storage usage specific to the one of the at least the particular person, project, and business entity is determined only from event information in the centralized search index and not through any information contained in the data itself;
in conjunction with determining the storage usage, receive input on a graphical user interface (GUI) using a pointing device to select one of the particular person, project, and business entity;
responsive to receiving the selection from the input of the pointing device, analyzing, in real-time when the selection is received, the metadata to identify storage capacity utilization information across the plurality of heterogeneous storage systems, wherein the metadata is custom metadata, the one or more events are from the plurality of heterogeneous storage systems, and the storage capacity utilization information is generated in real-time by scanning the metadata and aggregating the one or more events using the custom metadata at the time of receiving the selection of the input using the pointing device; and
map the user to a department of the business entity having set in the centralized search index department-specific metadata tags, wherein an authentication lookup of the user to determine the department to apply the department-specific metadata tags to the data is performed only when the user mapping to the department is unknown.

8. The system of claim 7, wherein the metadata is used in conjunction with storage size metadata, storage pool metadata, a type of operation, or a combination thereof; or
wherein the executable instructions tag the data of the one or more events with the metadata upon determining the data matches selected criteria of the one or more pre-defined rules.

9. The system of claim 7, wherein the executable instructions leverage a representational state transfer (REST) application protocol interface (API) to set the metadata.

10. The system of claim 7, wherein the executable instructions add key values to the metadata such that the key values are used as analytics for existing metadata records of events associated with the plurality of heterogeneous storage systems, wherein the centralized search index is a centralized key-value store.

11. The system of claim 7, wherein the executable instructions:
index the one or more events into the centralized search index; and
add the metadata to the data subsequent to indexing the event into the centralized search index, wherein the event includes one or more storage resource utilization metrics of the plurality of heterogeneous storage systems.

12. A computer program product for storage resource utilization analytics by a processor, the computer program product comprising a non-transitory computer-readable storage medium having computer-readable program code portions stored therein, the computer-readable program code portions comprising:
an executable portion that receives, by each of a plurality of heterogeneous storage systems of varying file system and object storage architectures, requests to perform storage actions on data respectively stored in the plurality of heterogeneous storage systems, wherein the requests to perform the storage actions are each initiated by a user or application on a computer in networked communication with a respective one of the plurality of heterogeneous storage systems in which the data is stored, and wherein metadata associated with each storage action is emitted by the respective one of the plurality of heterogeneous storage systems upon performing the storage action;
an executable portion that, responsive to performing the storage actions, creates, by each of the plurality of heterogeneous storage systems, one or more events containing the metadata respectively describing the storage actions;
an executable portion that, responsive to creating the one or more events, sends, by each of the plurality of heterogeneous storage systems, the one or more events and the metadata as a message to a centralized search index via a message queue;
an executable portion that, responsive to receiving the message by the centralized search index from the message queue, extracts the one or more events from the message and indexes the one or more events according to the metadata, wherein the metadata is normalized from a first format describing each storage action performed by those of the plurality of heterogeneous storage systems implementing the file system architecture and a second format describing each storage action performed by those of the plurality of heterogeneous storage systems implementing the object storage architecture into a third, standardized format for indexing;
an executable portion that determines storage capacity in each of the plurality of heterogeneous storage systems by exclusively examining, within the centralized search index for each respective storage system of the plurality of heterogeneous storage systems, the metadata associated with each storage action undertaken by the user or the application;
an executable portion that, responsive to receiving the one or more events by the plurality of heterogeneous storage systems and analyzing content of the one or more events, automatically tags data of the one or more events with the metadata in real-time as the data is received into one or more of the plurality of heterogeneous storage systems according to one or more pre-defined rules applied to the content, wherein determining the storage capacity further includes aggregating those of the one or more events having been automatically tagged as belonging to at least a particular person, project, and business entity, and determining storage usage specific to one of the at least the particular person, project, and business entity using only information contained in the metadata of those of the one or more events stored in the centralized search index such that the storage usage specific to the one of the at least the particular person, project, and business entity is determined only from event information in the centralized search index and not through any information contained in the data itself;
an executable portion that, in conjunction with determining the storage usage, receives input on a graphical user interface (GUI) using a pointing device to select one of the particular person, project, and business entity;
an executable portion that, responsive to receiving the selection from the input of the pointing device, analyzes, in real-time when the selection is received, the metadata to identify storage capacity utilization information across the plurality of heterogeneous storage systems, wherein the metadata is custom metadata, the one or more events are from the plurality of heterogeneous storage systems, and the storage capacity utilization information is generated in real-time by scanning the metadata and aggregating the one or more events using the custom metadata at the time of receiving the selection of the input using the pointing device; and
an executable portion that maps the user to a department of the business entity having set in the centralized search index department-specific metadata tags, wherein an authentication lookup of the user to determine the department to apply the department-specific metadata tags to the data is performed only when the user mapping to the department is unknown.

13. The computer program product of claim 12, wherein the metadata is used in conjunction with storage size metadata, storage pool metadata, a type of operation, or a combination thereof.

14. The computer program product of claim 13, further including an executable portion that tags the data of the one or more events with the metadata upon determining the data matches selected criteria of the one or more pre-defined rules.

15. The computer program product of claim 12, further including an executable portion that leverages a representational state transfer (REST) application protocol interface (API) to set the metadata.

16. The computer program product of claim 12, further including an executable portion that adds key values to the metadata such that the key values are used as analytics for existing metadata records of events associated with the plurality of heterogeneous storage systems, wherein the centralized search index is a centralized key-value store.

17. The computer program product of claim 12, further including an executable portion that:
indexes the one or more events into the centralized search index; and
adds the metadata to the data subsequent to indexing the event into the centralized search index, wherein the event includes one or more storage resource utilization metrics of the plurality of heterogeneous storage systems.

\* \* \* \* \*